US006891796B1

United States Patent
Manis et al.

(10) Patent No.: US 6,891,796 B1
(45) Date of Patent: May 10, 2005

(54) TRANSMITTING DATA IN A POWER LINE NETWORK USING LINK QUALITY ASSESSMENT

(75) Inventors: Constantine N. Manis, Monmouth Junction, NJ (US); Dick Walvis, Santa Cruz, CA (US); Mike Bautista, Portola Valley, CA (US); Tom Szilagyi, Felton, CA (US)

(73) Assignee: Arkados, Inc., North Plainfield, NJ (US)

( * ) Notice: Subject to any disclaimer, the term of this patent is extended or adjusted under 35 U.S.C. 154(b) by 775 days.

(21) Appl. No.: 09/605,066

(22) Filed: Jun. 28, 2000

Related U.S. Application Data

(63) Continuation-in-part of application No. 09/290,353, filed on Apr. 12, 1999, now abandoned.
(60) Provisional application No. 60/113,608, filed on Dec. 23, 1998.

(51) Int. Cl.$^7$ .............................................. H04L 12/28
(52) U.S. Cl. ........................ 370/229; 370/233; 370/238
(58) Field of Search .................................. 370/229–234, 370/237–238, 255, 258, 468, 230.1

(56) References Cited

U.S. PATENT DOCUMENTS

| 5,351,272 | A | * | 9/1994 | Abraham ..................... 375/260 |
| 5,553,072 | A | * | 9/1996 | Daggett et al. ............. 370/447 |
| 5,691,715 | A | * | 11/1997 | Ouellette ............... 340/870.09 |
| 6,141,388 | A | * | 10/2000 | Servais et al. .............. 375/262 |
| 6,259,673 | B1 | * | 7/2001 | Yoshihara et al. .......... 370/238 |
| 6,397,368 | B1 | | 5/2002 | Yonge, III et al. .......... 714/792 |
| 6,647,008 | B1 | * | 11/2003 | Galand et al. .............. 370/389 |
| 6,700,902 | B1 | * | 3/2004 | Meyer ........................ 370/468 |

* cited by examiner

*Primary Examiner*—Hassan Kizou
*Assistant Examiner*—Saba Tsegaye
(74) *Attorney, Agent, or Firm*—Norris, McLaughlin & Mar

(57) ABSTRACT

A method for selecting a communication path between two nodes of a powerline network using a link quality assessment algorithm which selects a communication path based on an analysis of historical data regarding the effective throughput of data transmitted between different nodes of the network. The algorithm is also used to select an appropriate gear for such communication based on an analysis of historical data regarding the unit error rates of data transmitted between the two nodes.

15 Claims, 1 Drawing Sheet

TRANSMITTING DATA IN A POWER LINE NETWORK USING LINK QUALITY ASSESSMENT

PRIORITY NOTICE

This U.S. patent application is a Continuation-In-Part of U.S. patent application Ser. No. 09/290,353 filed on Apr. 12, 1999 abandoned which claims the benefit of the Dec. 23, 1998 filing date of Provisional U.S. patent application Ser. No. 60/113,608, filed Dec. 23, 1998. This application is related to U.S. patent applications entitled Method for Transmitting a Signal on a Network and Method for Changing Signal Modulation Based on Analysis of Powerline Conditions which were both filed on Jun. 28, 2000.

FIELD OF THE INVENTION

The present invention pertains to powerline networks, and more particularly to a method for selecting a reliable communication path between two network nodes based on an analysis of node-to-node historical conditions and throughput values.

BACKGROUND OF THE INVENTION

Conventional networks typically use the open shortest path first (OSPF) method for selecting a communication path between two nodes. This method assumes that the shortest path between two nodes provides the most reliable communication path for transmitting path between the nodes. However, this method suffers from a significant drawback. Specifically, since the character of the powerlines in a network are constantly changing as a result of noise and other sources of signal degradation, the shortest path between two nodes does not always provide the best signal throughput. Accordingly, it is an object of the present invention to provide a method for selecting a path between two nodes having the greatest throughput.

SUMMARY OF THE INVENTION

A method for selecting a communication path between two nodes of a powerline network using a link quality assessment algorithm which selects a communication path based on an analysis of historical data regarding the effective throughput of data transmitted between different nodes of the network. The algorithm is also used to select an appropriate gear for such communication based on an analysis of historical data regarding the unit error rates of data transmitted between the nodes of the network.

BRIEF DESCRIPTION OF THE DRAWINGS

Table 1 shows a table of effective link throughput values for the nodes of a network.

DETAILED DESCRIPTION OF THE PRESENT INVENTION

Figure 1:
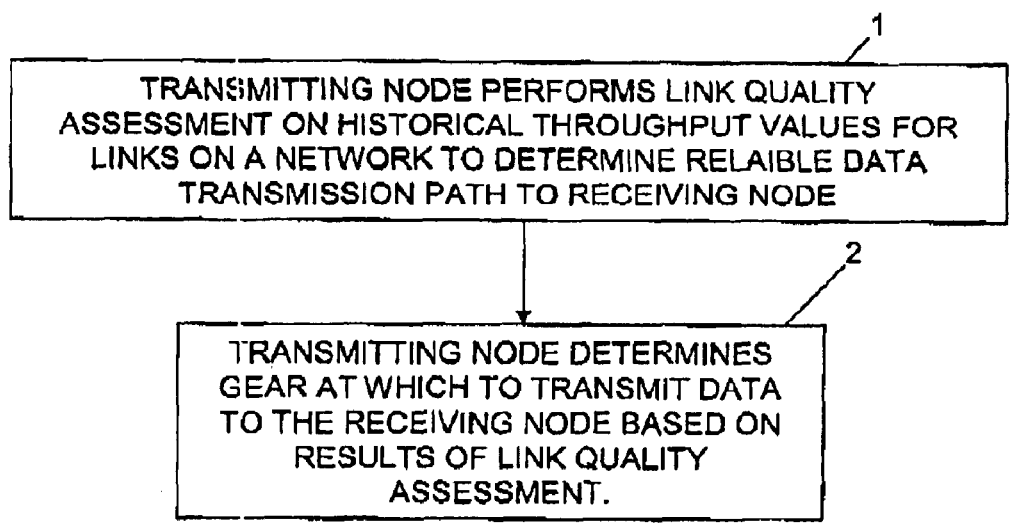
FIG. 1 shows a flowchart depicting the operation of the present invention.

The present invention uses a link quality assessment algorithm (LQAA) to determine the most viable communications path between two nodes of a powerline network. In such a network, a given node may not be able to communicate with all the other nodes due to changing characteristics in the powerline environment. The present invention ensures a reliable communication path by rotating communications through more reliable links on the network.

Historical communication data regarding Effective Link Throughput (ELT) is gathered and stored at each node of the network in the form of an ELT table. Periodically, each node enters the network which is fabricated as a token ring and broadcasts a normalized throughput value of between 0 and 1 for every other visible node on the network. All the other nodes on the network listen to the broadcast messages and compare the broadcast values for each node to the values that the listening nodes have stored in their respective ELT tables. This allows a listening node to determine, on a link-by-link basis, if an indirect path would provide a greater throughput than either the direct path or a previously recorded indirect path.

The historical data is used when a transmitting node wants to establish a session with a receiving node. The transmitting node uses the LQAA to analyze the throughput values in its ELT table to determine the best path for transmitting data to the receiving node. This technique is called a Historically Oriented Preference (HOP). For example, node A in a network may desire to communicate with node B. However, due to the physical characteristics of the network, establishing a direct link may not be as desirable as establishing an indirect link from node A to node B via node C. Based on data from its ELT table, transmitting node A determines the most efficient transmission path between itself and an intended recipient node.

Table 1 shows an example of an ELT table for a network with five nodes:

TABLE 1

| ELT | Node 1 | Node 2 | Node 3 | Node 4 | Node 5 |
|---|---|---|---|---|---|
| Node 1 | N/A | 0.25 | 0.8 | 0.82 | 0.79 |
| Node 2 | 0.25 | N/A | 0.91 | 0.81 | 0.85 |
| Node 3 | 0.76 | 0.9 | N/A | 0.76 | 0.87 |
| Node 4 | 0.82 | 0.81 | 0.84 | N/A | 0.63 |
| Node 5 | 0.79 | 0.85 | 0.85 | 0.63 | N/A |

The ELT for Node 5 to Node 3 communication is 0.85, while for Node 3 to Node 5 it is 0.87, thus evidencing the existence of slight asymmetries in the forward and reverse communication directions. The ELT for Node 3 to Node 2 communication and for Node 2 to Node 3 communication are below 0.30, i.e., 30%, and are thus inefficient for this network. This threshold can be different for other networks. For ELT values that are smaller than some minimum threshold value, e.g., 0.30, set by the protocol controller, the transmitting node will attempt to find a more efficient indirect path linking itself and the intended recipient node.

All nodes in the network check their ELT for a given link versus the product of the ELT of the broadcasting node multiplied by the ELT between itself and the broadcasting node, which product is then divided by 2 because the additional router between the two nodes will need to fully receive the frame before it can transmit, effectively doubling the time necessary to forward a frame. For example, referring to Table 1, nodes 1, 2 and 3 in which node 1 has an ELT for 1→2=0.25, node 1 ELT for 1→3=0.8, and node 3 broadcasts an ELT for 3→2=0.90. Node 1 compares the ELT for 1→3→2 as 0.9*0.8/2=0.36 versus the ELT for 1→2=0.25. Thus, Node 1 subsequently routes all traffic destined for node 2 through intermediate router node 3.

The present invention uses the LQAA to analyze historical communication data regarding unit error rates (UER) stored on the network at the different nodes to determine the gear at which communication between nodes occurs. A gear describes the packet structure and speed at which data is transmitted from a first node to a second node in an intelligent network. The transmitting node uses the LQAA to determine the gear at which it will transmit data to the second node. The following characteristics vary for and differentiate the different gears: the number of packet lengths per unit; the number of units per slate; the TAG length; and the ratio of CRC to FEC code within the slates.

The UER is calculated as a ratio of units known to have been received correctly by the receiving node vs. units known to have been received with CRC failures by the receiving node. The historical data is used when a transmitting node establishes a session with a receiving node. This allows the transmitting node to select the gear based on an analysis of HOP data regarding the gear that was known to previously work well.

Based upon an analysis of line conditions, the algorithm dynamically adjusts the gear according to values in the UER table. This allows the node to adjust the robustness of the communication data by adjusting the packet size and other slate parameters. In the presence of a high historical UER, the transmitting node will choose a gear with a smaller payload-to-protection ratio since the large UER is a result of impulsive noise, such as a spike. Conversely, in the presence of a low historical UER, the transmitting node will choose a gear with a higher payload-to- protection ratio since the small UER is due to an absence of impulsive noise and thus less protection is required.

FIG. 1 shows a flowchart depicting the operation of the present invention. At step 1, the transmitting node uses the LQAA to examine historical throughput values for links on a network and determine a reliable path to transmit data to the receiving node. At step 2, the transmitting node uses the LQAA to determine the gear at which to transmit data to the receiving node.

The present invention is implemented using software which can be written in any computer language, and hardware in the form of one or more integrated circuit chips. Acceptable threshold values such throughput and unit error rate, are selectively set using the software. Although the present invention is described herein as being implemented using a token ring network, the present invention can be implemented using any kind of network structure.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A method for transmitting data between nodes on a powerline network, comprising the step of:
    selecting a communication path by examining throughput values stored at a first one of the plurality of nodes on the powerline network from which a link is to be established to a second one of a plurality of nodes, wherein the examining of the throughput values comprises determining an optimum size of a data packet for transmitting data between the first and second nodes and wherein the throughput values indicate the reliability of a communication path between the first node and the second node.

2. The method according to claim 1, further comprising the step of:
    analyzing unit error rates stored at the first node to determine a gear to use for communicating with the second node, the unit error rates indicating the historical error rate for communications transmitted from the first node to the second node.

3. The method of claim 1, wherein the selecting a communication path further comprises examining a throughput value representative of a current condition of a link of the powerline network.

4. A method for transmitting a signal on a powerline network, comprising the steps of:
    examining throughput values stored at a first one of the plurality of nodes on the powerline network from which a link is to be established to a second one of a plurality of nodes, wherein the examining of the throughput values comprises determining an optimum size of a data packet for transmitting data between the first and second nodes and wherein the throughput values indicate the reliability of a communication path between the first node and the second node; and
    analyzing unit error rates stored at the first node to determine a gear to use for communicating with the second node, the unit error rates indicating a historical error rate for communications transmitted from the first node to the second node.

5. The method according to claim 4, wherein the first node compiles the throughput values by listening to each one of the other nodes broadcast throughput values for communication from each one of the said other nodes to every other node on the powerline network.

6. The method according to claim 5, further comprising the step of periodically updating the throughput values stored at the first node based on the throughput values broadcast by each one of the other nodes.

7. The method according to claim 4, wherein the first node compiles the unit error rates by periodically analyzing historical data regarding unit error rates for communications between the first node and the other nodes including the second node.

8. The method according to claim 4, wherein each throughput values has a value of between zero and one.

9. The method according to claim 4, wherein the uniform error rate is calculated as a ratio of units known to have been correctly received by a receiving node versus units known to have been received with CRC by the receiving node.

10. The method according to claim 4, wherein the method is employed on a token ring.

11. The method according to claim 4, wherein the gear describes different communication rates for communicating between the first node and the second node, wherein the gear is comprised of the data packet, the error correction rate, and the speed of data communication.

12. The method according to claim 4, where in the presence of a high unit error rate, the first node will choose a gear for transmitting data having a lower payload-to-protection ratio since the large uniform error rate is the result of impulsive noise.

13. The method according to claim 4, wherein in the presence of a low uniform error rate, the transmitting node will select a gear having a higher payload to protection ratio since the low uniform error rate is the result of the absence of impulsive noise.

14. The method according to claim 4, wherein the method is implemented using an algorithm.

15. The method according to claim 4, wherein the method is implemented using an integrated circuit chip.

* * * * *